April 24, 1962  P. W. KUSTUSCH  3,030,776
HYDROMECHANICAL DEVICE
Filed Feb. 15, 1960  8 Sheets-Sheet 1

INVENTOR.
PAUL W. KUSTUSCH.
BY Louis Chayka
ATTORNEY

April 24, 1962

P. W. KUSTUSCH 3,030,776

HYDROMECHANICAL DEVICE

Filed Feb. 15, 1960

INVENTOR.
PAUL W. KUSTUSCH
BY Louis Chayka
ATTORNEY

April 24, 1962　　　P. W. KUSTUSCH　　　3,030,776
HYDROMECHANICAL DEVICE
Filed Feb. 15, 1960　　　　　　　　　　　　8 Sheets-Sheet 4

INVENTOR.
PAUL W. KUSTUSCH.
BY Louis Chayfer
ATTORNEY

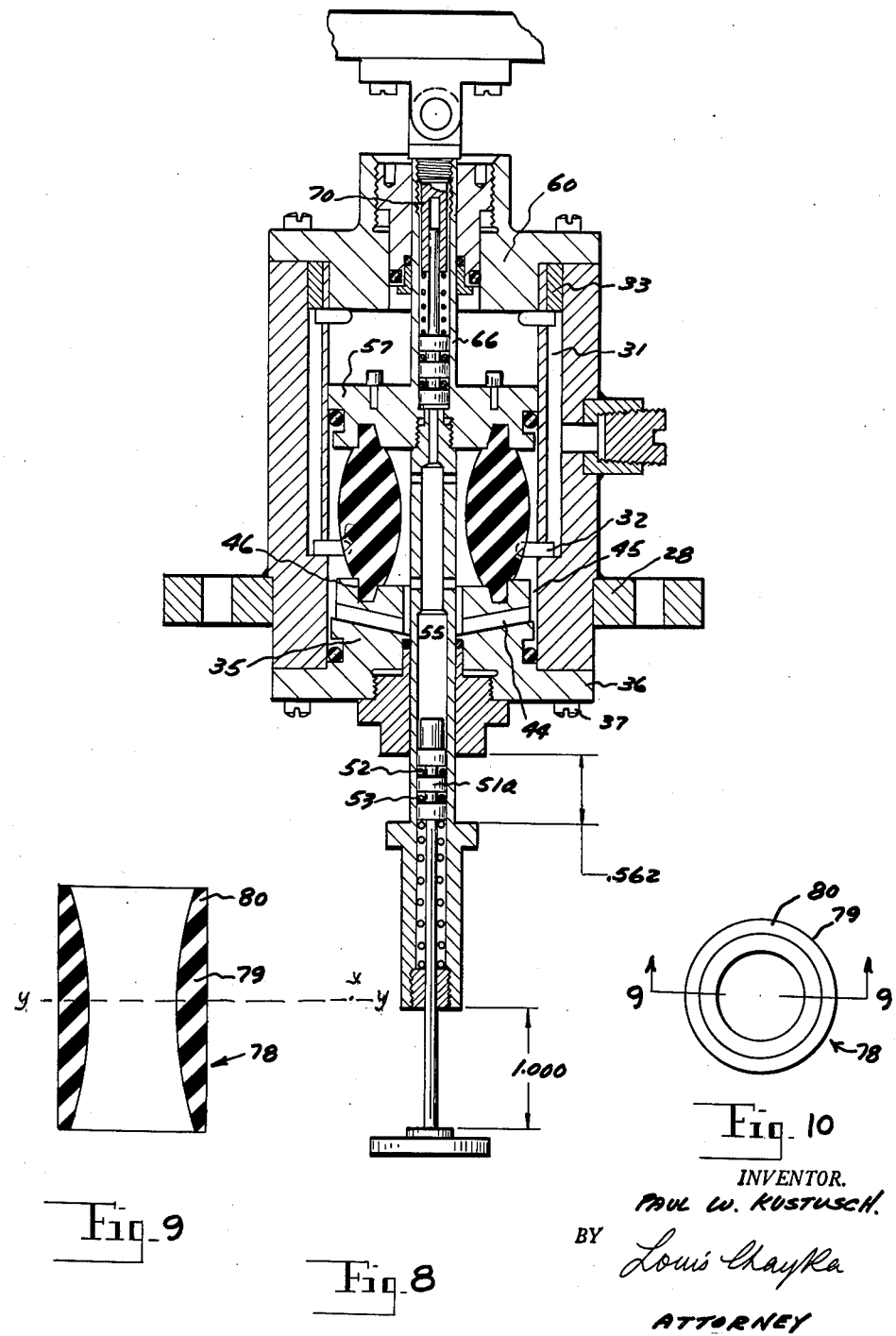

United States Patent Office 3,030,776
Patented Apr. 24, 1962

3,030,776
HYDROMECHANICAL DEVICE
Paul W. Kustusch, 550 Parkview Drive, Apt. 212, Detroit, Mich.
Filed Feb. 15, 1960, Ser. No. 8,807
8 Claims. (Cl. 60—54.5)

The invention pertains to a mechanism which is designed upon a new concept and which employs a deformable resilient body having a tendency after its deformation to resume its original shape, and hydraulic pressure applied to said body while it resumes its original shape and thereby presents a gradually increasing surface area against which said pressure is delivered. It is the combination of the two forces which results in an available power output materially in excess of the input. In one practical application the mechanism may be used as a press, and it is such a press which I shall now describe with reference to the accompanying drawings in which:

FIG. 1 is a side elevational view of the press, the press including a cylindrical housing which contains the operative assembly thereof;

Each of the FIGS. 2, 3, 7 and 8 shows a vertical sectional view of the housing, but in each figure certain operative elements are shown in different positions;

Each of the FIGS. 4, 5, and 6 shows a fragmentary view of the press with certain operative elements in different positions;

FIG. 9 is a vertical sectional view of a deformable resilient body;

FIG. 10 is a top elevational view thereof;

Similar numerals refer to similar parts throughout the several views.

Figures 1, 11:
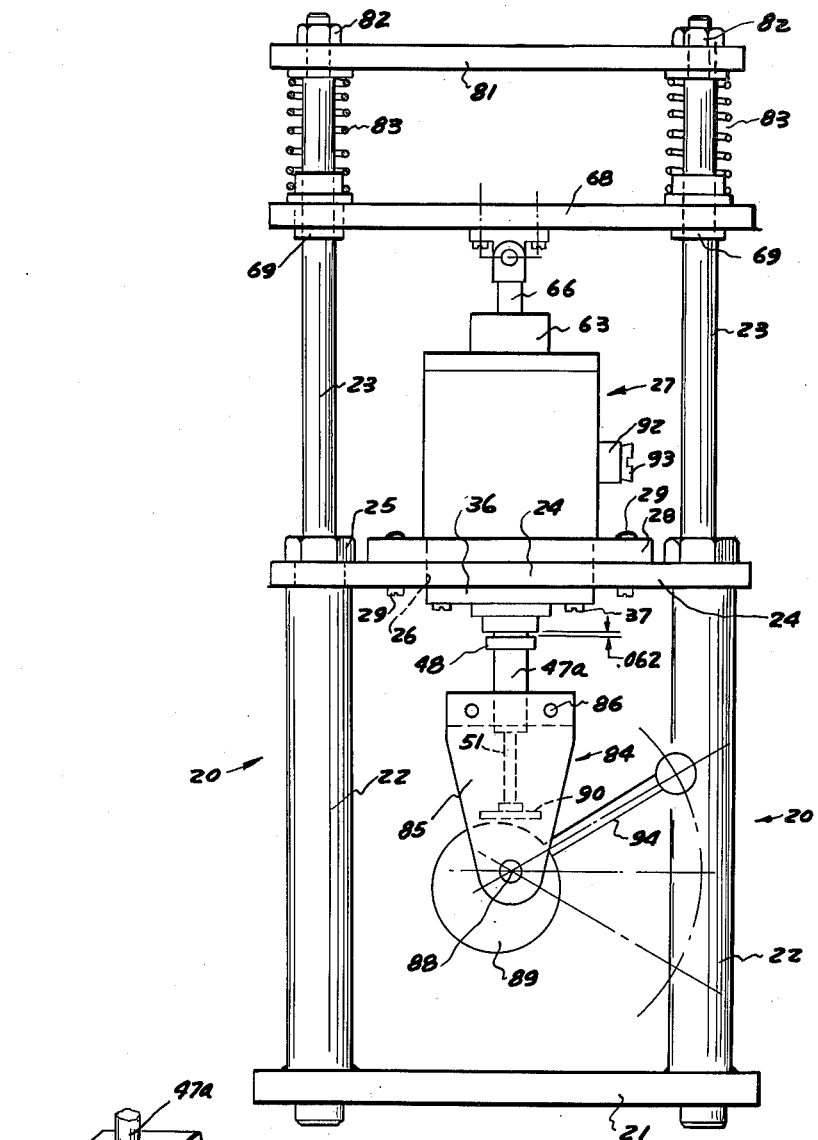
FIG. 11 is a perspective view of a yoke forming a part of the press.

The press shown in FIG. 1 includes a pair of standards generally marked 20, the standards rising from a stationary base 21. Each of the standards consists of a lower cylindrical member 22 and a slender upper member 23 which is in a telescopic and preferably adjustable relation to said lower member. Secured to the standards at the junction of the two component members of each, is a horizontal platform 24 which at the junction with the standards is held in place by means of nuts 25. The platform is provided with a circular aperture 26, and fitting into said aperture from above is a drum, generally identified by numeral 27. The drum is provided with an annular flange 28 which is welded thereto and which contains a number of holes for application of bolts 29 whereby the flange is secured to the platform 24.

Figure 2:
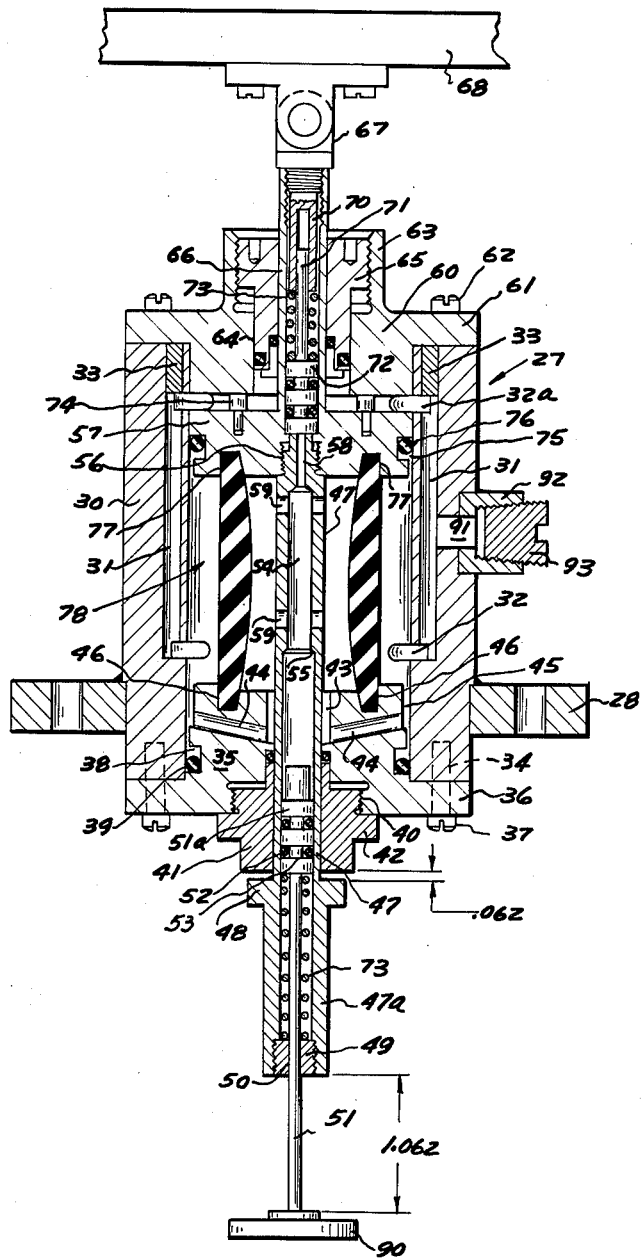

The drum, as shown in FIG. 2, consists of a thick walled cylindrical casing 30 which is disposed vertically, the casing being open at both ends and being of uniform inner diameter from end to end.

The wall of the casing contains a plurality of vertical bores 31 in a spaced relation to each other. The bores leading from the top of the casing to a level at its lower portion, each of them being intersected at the lower end by a slot 32 opening into said bore from the interior of said casing. Similarly each bore is intersected by a slot 32a at the upper portion at a level spaced from the top of the casing, but the remaining length of each bore above the upper slot 32a is closed by a plug 33. At the lower end the circular wall of the casing is provided with a number of vertical threaded bores 34. These are shown in FIG. 2 but omitted in other figures.

Fitting into the casing 30 from below is a cylindrical block 35 of a smaller diameter than that of the interior of the casing so that there is a free space 45 between the outer surface of the block and the inner surface of the casing. A flange 36, extending radially from the block, contains a number of holes for reception of screws 37.

With the flange drawn tight against the lower rim of the casing 30, the interior thereof is closed from the bottom. The base of the block is provided with an axial socket 40 and threaded into it is a bushing 41. The bushing includes an external flange 42 which bears against the undersurface of said block 35. The socket 40 opens into an axial bore 43, leading up to the top of the block. Radially extending from said bore are a number of upwardly slanting ducts 44 which lead into the free space 45 between the outer surface of the block and the inner surface of the casing. Finally, I wish to add, that formed in the top surface of the block is a concentric annular groove 46.

Fitting into the interior of the casing 30 through the axial opening in said bushing 41 is a tubular stem 47. At its lower end the stem is formed with a flange 48 which is normally in a spaced relation to the lower end of the bushing, the spacing being exemplified by a distance of .062 inch as shown in FIG. 2. The figure is of critical importance only when it refers to such specific distances as shown and marked in the drawings, it being understood that in structures in which the respective operative elements are built to a different scale the distances will vary. Beginning from the flange 48 downwardly, the stem is expanded radially as shown at 47a. This radially expanded length of the stem has, at its lower end, an internally threaded portion, and threaded into said end is a closure 49 containing an axial opening 50. Disposed within the interior of the stem 47 is a piston 51a which will be referred to as the cam piston, and which may be integrally formed with a piston rod 51. The piston is equipped with a number of oil rings 52 fitting into annular grooves 53 in the surface of said piston.

The inner diameter of the stem 47 is reduced at about the level of the slots 32 as shown at 54, where the reduction of said diameter results in the formation of a shoulder 55. At its upper end the stem is threaded into a socket 56 in a piston 57 which will be called the main piston and which will be presently described in detail. The end portion of the stem 47, fitting into said last named socket, contains a narrow axial duct 58. Between said shoulder 55 and the upper end of the tubular stem 47, the latter is provided with lateral ports 59.

A circular block 60, similar to the block 35, which is located in the lower end of the casing 30, fits into the upper end of said casing but the outer surface of the block is in a leak proof contact with the inner surface of said casing. A radial flange 61 of said block 60, is secured to the upper rim of the casing by screws 62 in the same manner as the flange 36 is secured to the lower rim of said casing. It will be noted that the lower surface of the block 60 is at the level just above the slots 32a leading into the ducts 31.

The block 60 includes a collar like structure 63 rising from its upper surface, the structure being disposed about the relatively large axial aperture 64 within said block. Fitting into said aperture is a bushing 65 and passing through said bushing from above is a tubular piston rod 66, called the main piston rod, which, at its lower end, is connected to the above said main piston 57. The opposite or the upper end of the piston rod 66 is secured to a bracket 67 mounted on the underside of the cross bar 68. The bar, as shown in FIG. 1, is connected at each end to a sleeve 69 embracing the respective upper member 23 of the standard 20.

An important feature of the tubular piston rod 66 is its diameter which is the same as the diameter of the stem 47 beginning from the main piston 57 down to the flange 48 in the lower portion of said stem.

Threaded into the upper end of the piston rod 66 is a tubular liner 70 and axially disposed for reciprocal movement therein is a rod 71 integrally connected to a piston 72 which shall be referred to as the pressure relief piston. The piston is similar to the piston 51a already described herein. A spring 73 (FIG. 3), coiled about the rod 71, bears at one end against said piston 72, while the other end of the spring bears against the lower end of the liner 70.

The large or main piston 57, carries a number of vertically disposed pins, the head of which, marked 74, project above the upper surface of the piston and act as spacers intended to keep the piston from being moved upwardly to a position where they would block the slots 32a. An annular groove 75 in the side surface of the piston 57 contains an oil ring 76 similar to oil ring or seal 39 already described herein. On its under surface, the block 57 is provided with a concentric annular groove 77 (FIG. 7), which is analogous to the groove 46 in the lower block, the grooves 77 and 46 being of the same diameter and being in register vertically with each other.

Each of the two grooves forms a seat for reception of one end of a deformable body in the shape of a cylinder 78. Such a body is shown in FIG. 9. It is open at both ends, its wall 79 tapering in thickness from its midportion towards each end. More specifically, the cylinder is defined on the outside by a straight vertical surface, while the inner surface defines an arc drawn to a radius from a point "x" on a horizontal line "y—y," bisecting the cylinder midway its height.

The cylinder is made of a material having such characteristics that it may be deformed by pressure applied to it endwise, and that after having been deformed it will, on relief of said pressure, resume its original shape. These characteristics are subject to the limitation that the pressure will not be applied to the cylinder to a degree beyond which the molecular structure of the cylinder would be so impaired as to affect its capacity to resume its original shape. Within these limits, the materials out of which the body is made may include plastics and metals.

While the deformable body shown in FIG. 9 has the form of a cylinder, and while this form is preferred, it will be understood that this is not the critical form of said body and that it may be made in other geometrical forms in which at least one end opens into a hollow interior.

Returning now to FIG. 1, I shall refer to the upper portions 23 of the standards 20. These upper portions 23 are joined at the top by a cross-bar 81 which is retained in place at each end by means of nuts 82. Coiled about each of said portions 23 between the bar 68 and said bar 81 is a heavy spring 83, each spring bearing at its lower end against the sleeve to which the bar 68 is connected. Shown also in said FIG. 1 is a yoke 84 shown also in FIG. 11. The yoke consists of two component parts 85 joined together by bolts 86, each part including a downwardly-turned V-shaped plate provided at each lower portion with a bearing 87 for reception of a cross-pin 88. The latter serves to support a cam 89 which is made in the form of a disk in off-center relation to said pin 88. The yoke is connected to the lower end of the expanded portion 47a of the stem 47 by having said portion 47a clamped between said members 85. Located between the V-shaped plates of said yoke, and carried by the lower end of the piston rod 51, is a flat, horizontally-disposed plate 90 adapted to be brought in contact with said cam 89, and serving as a lifter for said rod 51.

At this point I wish to add that the casing 30 is provided, midway its height, with an inlet port 91 and a bushing associated therewith, the bushing being threaded internally for reception of a plug 93.

The manner in which the press works is as follows:

To start with, it will be understood that the interior of the casing and the interior of the cylinder 78 are to be filled with a liquid medium such as oil. It will be further understood that at the initial stage of the operation of the press, the main piston 57 is in its uppermost position and that it is spaced from the block 68 only by the heads of pins 74. The quantity of oil within the casing and the cylinder is such that there are no spaces free of oil in the casing, in the cylinder, or in any ducts or passages connecting with the interior of said casing.

For the purpose of orderly presentation of the operation of the press, the springs 83 at the top of the press and their function will be temporarily disregarded. Furthermore, it will be assumed that the cylinder 78 is in its fully-expanded condition vertically, as shown in FIG. 2. At this stage, the small pressure-relief piston 72 will be held at its lowest position by the coiled spring 73 in the tubular piston rod 66. The other small piston, that is, the cam piston 51a, carried by the piston rod 51 and biased by the coiled spring 73, exerts a light pressure upon the oil within the casing, but the lifter 90 at the lower end of said piston rod 51 is out of contact with the cam 89, as shown in FIG. 1.

It will now be assumed that the press has been completed by the installation of said springs 83, these being of such a potential that starting from their compressed condition they will be able, by means of the cross-bar 68 and the piston rod 66, to overcome the resistance of the deformable cylinder 78 to such an extent that the body of the cylinder will be shortened in height, while the wall thereof will be expanded in thickness laterally, thus displacing oil or liquid in addition to that displaced by the downward movement of main piston 57. It will be understood that the material of the cylinder is of a type permitting the deformation of the cylinder without increasing or decreasing the total volume of the body structure thereof.

During the downward movement of the main piston 57, a quantity of oil will be forced through the slots 32 within the lower portion of the casing 30 into the vertical ducts 31 and into the interior of the casing above the piston through the slots 32a in the upper portion of said casing.

Figure 3:
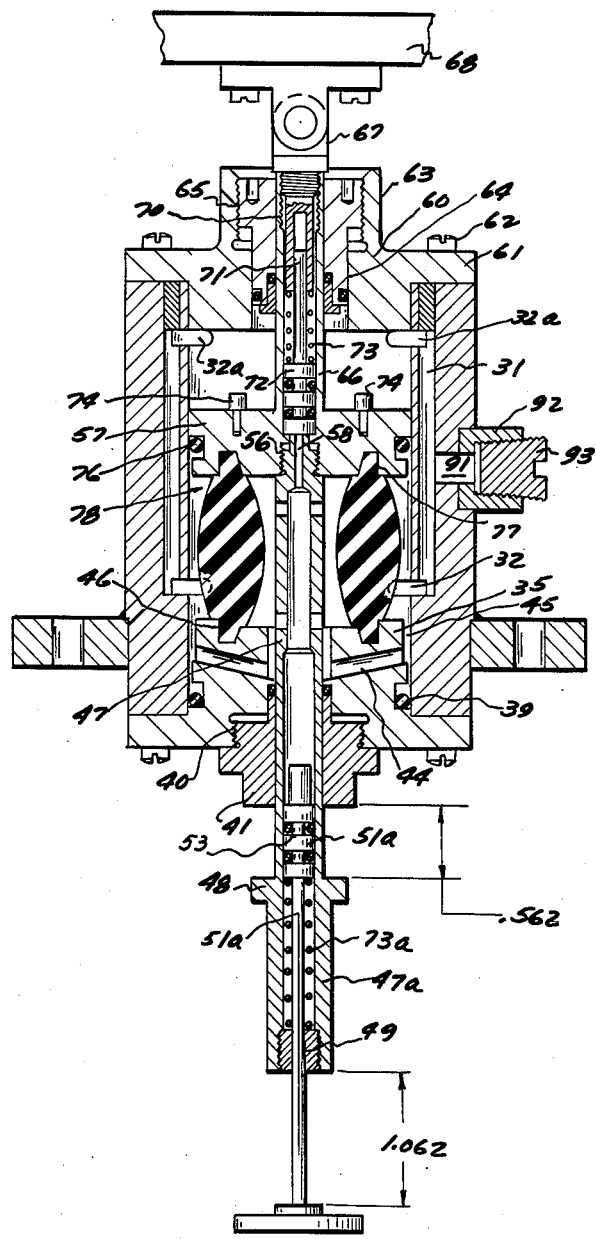
Figure 4:
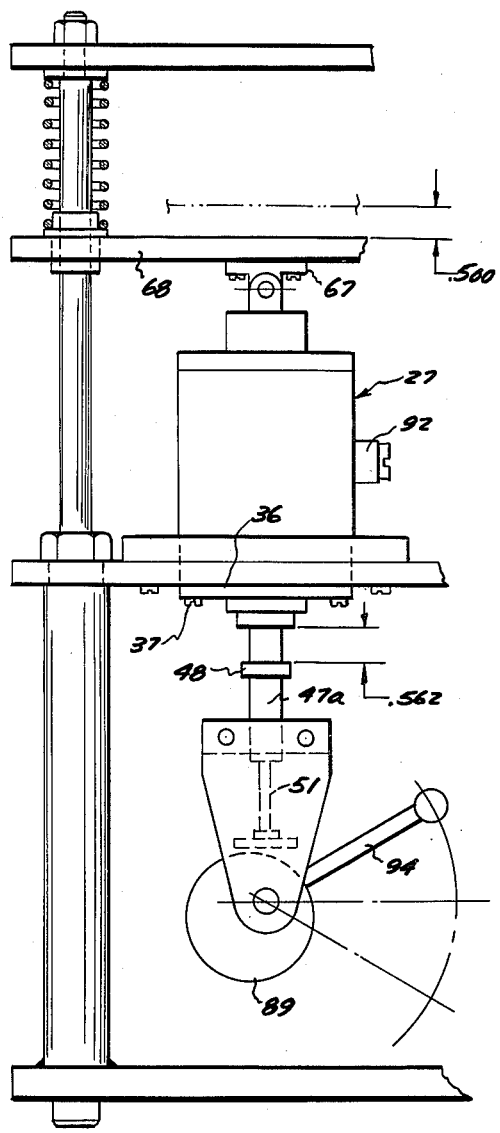

Moving with the main piston 57 is the tubular piston rod 66, but as it enters into the casing, the stem 47, which is of the same diameter, moves downwardly, receding out of the casing, so that the volume of oil within the casing is always the same. As this is also true of the volume of the cylinder 78, which volume has not been affected by the deformation of said cylinder, the small pistons 51a and 72 will retain the relative positions to the piston rod 66 and to the stem 47, respectively. This is shown in FIG. 3. It will be noted that the flange 48 in the stem 47 is now at a much larger spacing (FIGS. 3 and 4) than it was at first, as shown in FIGS. 1 and 2, from the bushing 41.

Figure 5:
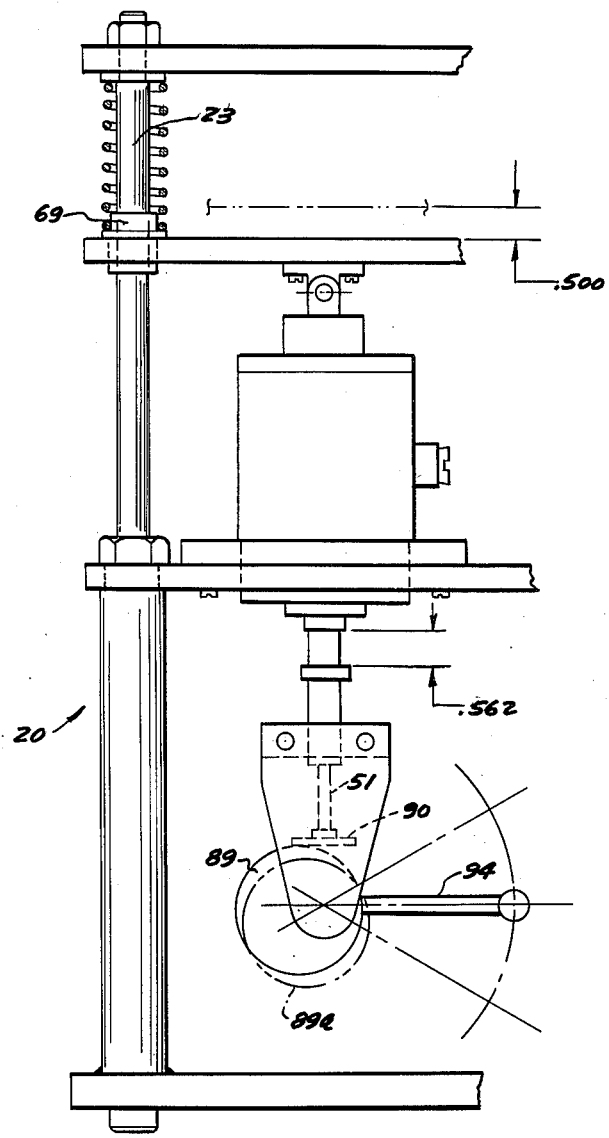

Next, the cam 89 is turned, by means of a radial lever 94 connected to said cam, clockwise from the position shown in FIG. 1 to the position shown in FIG. 5, this representing the distance of approximately 30 degrees, bringing the lever to a horizontal position 89a. Because of said turn, the cam, in its new position 89a, will engage the lifter 90 of the piston rod 51, and by means of said rod will push the cam piston 51a upwardly. The distance of said upward push of the piston 51a is illustrated in FIG. 8 where the original spacing between the lifter 90 and the lower end of the stem 47 at the start of the upward push, as represented in inches, was 1.062 (FIG. 2), and where said spacing, as shown in FIG. 8, has been reduced by the upward push of the piston to 1.000.

The movement of said piston 51a raises the pressure of the fluid medium against the wall surface of the cylinder and serves as a means to initiate an impetus within the structure of the cylinder to resume its original form. The pressure, maintained at a constant level, will now be directed laterally against the gradually-increasing surface of the wall of the cylinder from inside and from outside.

The cylinder, rising upwardly, will now deliver a thrust which will be a composite of the tendency of the cylinder to resume its original form and of the pressure of the fluid medium exerted laterally against the wall of the cylinder from inside and from outside. This is illustrated diagrammatically in FIG. 12 in which numeral 78 indicates the cylinder, arrows 100 indicate hydraulic pressure against the outer surface of said cylinder, arrows 101 indicate pressure against the inner wall of the cylinder, and the arrow 102 indicates the force of the resilient feature of the cylinder towards resumption of the original shape thereof.

Figure 6:
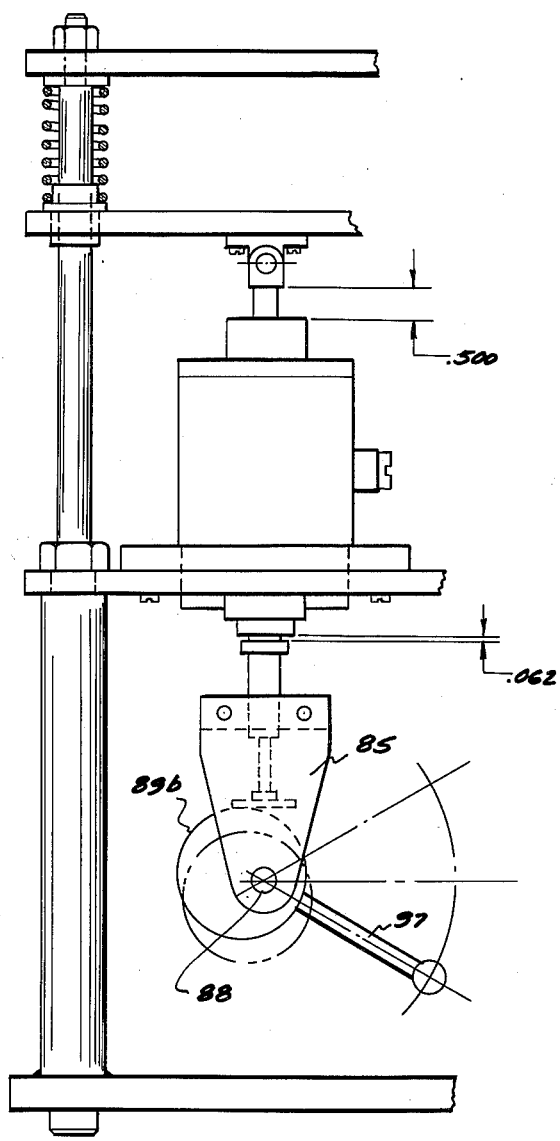
Figures 7, 12:
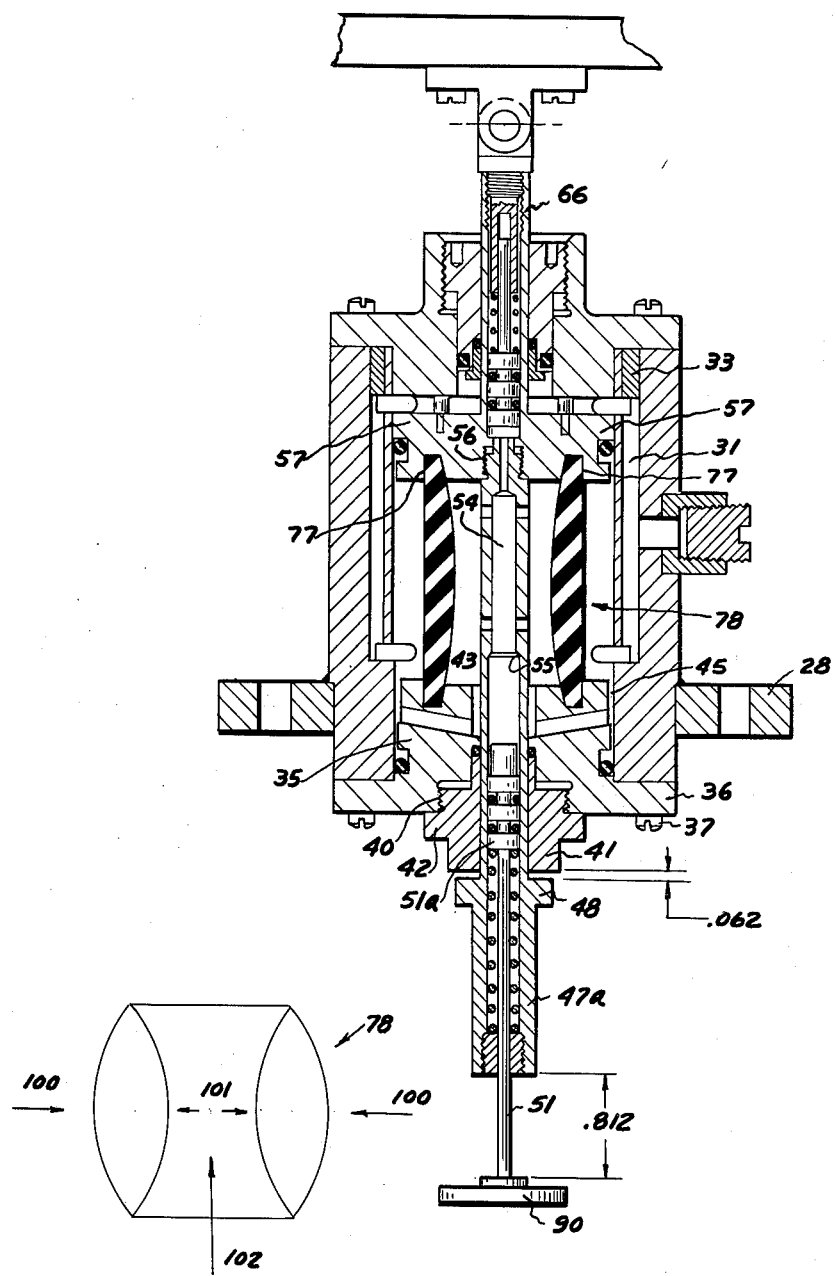
FIG. 12 is a diagrammatical view of the forces applied to the cylinder within the press.

The pressure initiated by the upward movement of the piston 51a by means of the cam 89 may now be further increased by the turn of the cam to the additional distance of 30 degrees, as shown in FIG. 6 in which the new position of the cam is marked 89b. The additional vertical movement of the piston 51a into the stem 47 is shown in FIG. 7 where the distance between the lifter 90 and the lower end of the portion 47a of the stem 47 has been reduced from the original distance of 1.062 inches to 0.812 inch.

The piston 51a, as actuated by said cam, has actually a double purpose. First, it serves as a means of increasing the pressure of the fluid medium within the casing. Second, it serves, with the piston 72, as a means of keeping the casing 30 always filled with oil and to compensate for the minute variations in the volume of oil within the casing, which variations may be due to slight inequalities in the respective diameters of the tubular piston rod 66 and that of the stem 47.

Assuming that the pressure delivered by the springs to deform the cylinder amounts to L pounds, it will require the same L pressure to balance the force of said springs and an additional pressure H, applied against the main cylinder from below, to cause its movement upwardly. This additional H pressure is supplied by the hydraulic pressure generated by the small-area cam piston 51a, but delivered against the relatively very large area of the undersurface of the main cylinder and against the gradually-increasing surfaces of the deformable cylinder from inside and outside. As the total pressure measured in pounds is in direct proportion to the available area of hydraulic pressure, and as said pressure is kept at a constant level, the pressure of the upward thrust of said main cylinder may exceed by many times the L pressure by means of which the cylinder had been deformed.

After the return of the piston 57 to its starting position at the top of the casing 30, a turn of the cam 89 back to its initial position will lower the pressure of the fluid medium within the casing to the level at which the springs 83 associated with the tubular piston rod 66 and the piston 57 will again move said piston downwardly against the deformable cylinder and deform the same. Thus, a new cycle will be started in the manner described above.

Building on the basis of the above disclosure, it is easy to visualize a variety of uses for the mechanism. As an example, one concept may be directed to a bank of such mechanism in combination, wherein a part of the output of one mechanism may serve as the initial force or initial input in the next mechanism. Here, in turn, just a part of the output may be used as the initial force for the next mechanism, so that all of them together may produce a continuous flow of power.

After having described the above invention, what I wish to claim is as follows:

1. In combination, a casing defined, in part, by a first closure at one end thereof and a second closure at the other end, each of the closures having an aperture, the apertures being axially alined, a main piston within the casing, a first piston rod extending from said main piston through the aperture in the first closure, a hollow body within the casing, the body being built symmetrically about the axis of the piston and being held at one end by said first closure, while the other end of said body is in contact with the piston, the body being adapted to be deformed by pressure applied to it by said piston endwise while its volume remains constant, but having the capacity of resuming its shape on relief of said pressure, a hollow stem extending from the piston through the interior of the hollow body and through the aperture in the second closure and outwardly of the casing, the stem being provided with apertures opening into the interior of said hollow body, the diameter of the stem being equal to that of the abovesaid main piston, a fluid medium filling the casing, the body, and the stem to the full capacity of each, spring means associated with the first piston rod outside the casing, the spring means being of a potential to deform said body by means of said piston, the first-named closure being provided with passageways leading into the interior of said body and into the casing outside said body, the casing providing passageways for the movement of the fluid medium from one end portion of the casing past the piston to the other end thereof, a second piston within the stem, the second piston being spring biased for movement towards the interior of the casing, and means operable from outside the casing to move said second piston within the stem to generate pressure within the fluid medium and to cause the main piston to return to its initial position, the power to operate said second piston being but a fraction of the force exerted by the spring means associated with the first piston rod.

2. In a device of the kind described, a vertically-disposed cylindrical casing having a top closure and a bottom closure, each of the closures being provided with a central aperture, a hollow geometrical body disposed upon the bottom closure, the body being open at both ends and being formed about a vertical axis, said body being adapted to be deformed by pressure applied to it endwise, but having the inherent capacity to resume its original shape on relief of said pressure, a main piston within the casing, the piston being provided with a rod extending out of the casing through the aperture in the top closure, means outside the casing to provide power to depress the piston against the resistance of the geometrical body, a hollow stem axially secured to the main piston, the stem passing axially through said body and extending out of the casing through the aperture in the bottom closure, the stem having openings into the interior of the body, a fluid medium filling the casing, the stem, and said hollow body, the bottom closure being provided with ducts leading into the interior or said body and into the space within the casing outside said body, said casing being provided with ducts leading from its lower portion to its upper portion, and a second piston within the stem, said second piston being operable from outside to generate pressure in said fluid medium.

3. A hydromechanical device including a vertically-disposed cylindrical casing, a bottom closure, a top closure, each of the closures being provided with a central aperture, a thick-walled cylinder mounted coaxially within the casing upon the bottom closure, the cylinder being made of elastic and resilient material capable of being deformed by pressure endwise, and having the inherent capacity of resuming its original shape on relief of said pressure, a main piston disposed vertically upon the bottom closure for engagement with said cylinder from above, a main piston rod extending from said main piston upwardly through the aperture in the top closure, spring means associated with the main piston rod to move the piston downwardly against said cylinder to deform the same, a tubular stem connected to the piston and extending therefrom through the interior of the deformable cylinder and through the aperture in the bottom closure, the stem and the main piston being of the same diameter, a fluid medium filling the interior of the cylindrical casing, the deformable cylinder, and the stem, a second piston in the stem, the second piston being biased by a spring for movement upwardly and being provided with a rod extending downwardly and outwardly from said stem, the bottom closure being provided with ducts leading into the interior of the deformable cylinder and into the casing outside said cylinder, the casing being provided with vertical ducts for passage of the fluid medium from the space beneath the piston to the space above the piston, and cam means operable outside the casing and connected to the stem, and adapted to engage the rod carrying the second piston to push the second piston upwardly to generate pressure in the fluid medium within the casing to cause the main piston to return to its initial position.

4. A hydromechanical device including a stationary cylindrical casing disposed vertically, a bottom closure and a top closure therefor, each of the closures being provided with a central circular aperture, a hollow body of geometrical shape built about a vertical axis and open at both ends, the body being mounted upon the bottom closure and being adapted to be deformed by pressure applied to it endwise, but having the inherent capacity of quickly resuming its original shape on relief of said pressure, a main piston disposed within the casing above said body, a main piston rod extending from the main piston through the aperture in the top closure, spring means mounted upon a stationary support outside the casing and connected to the main piston rod to impart a downward movement to the main piston, a tubular stem extending axially from the piston through the interior of said hollow body and through the aperture in the lower closure, downwardly and outwardly thereof, the stem and the main piston rod being of the same diameter and being axially open into each other through a central aperture in said main piston, said stem being provided with openings into the interior of said body, a second piston within the stem, a second piston rod extending from said second piston downwardly and being spring biased for movement upwardly, a liquid medium filling the interior of the casing, the hollow body, and the stem, passageways within the casing leading from the space below the main piston to the space above said piston, passageways within the bottom closure leading into the interior of said body and to the space outside thereof, spring means mounted upon a stationary support outside the casing and acting upon said main piston rod and the main piston to deform said hollow body, and cam means associated with the stem and operable from outside the casing to engage the rod extending from the second piston to move said second piston upwardly to generate pressure within the liquid medium within the casing.

5. A structure as defined in claim 4 in which the main piston rod is of tubular structure and contains a pressure-relief piston biased by spring means for movement downwardly, but adapted to be moved upwardly against the tension of said spring means in response to increased pressure within the casing.

6. A hydromechanical device including a framework, a cylindrical casing supported thereby in a stationary position, a bottom closure and a top closure in said casing, each closure being provided with a central aperture, a hollow body of geometrical shape built about a vertical axis and being open at both ends, the body being mounted upon the bottom closure and being adapted to be deformed by pressure applied to it endwise, but having the inherent capacity of resuming its initial shape on relief of said pressure, a main piston disposed within the casing for vertical movement therein, a main piston rod extending from the main piston upwardly through the aperture in the top closure, a horizontal bar disposed diametrically above said casing and connected to the upper end of said main piston rod for movement therewith, a second bar forming a stationary part of the framework and being disposed in a vertically-spaced parallel relation to the first-named bar, spring means compressed between the two bars to impart a downward movement to the main piston against the resistance of the hollow body, a tubular stem extending axially from the piston through the interior of said hollow body and through the aperture in the lower closure, downwardly and outwardly thereof, the stem and the main piston rod being of the same diameter and being axially open into each other through a central aperture in said main piston, said stem being provided with openings into the interior of said body, a second piston within the stem, a second piston rod extending from aid second piston downwardly and being spring biased for movement upwardly, a liquid medium filling the interior of the casing, the hollow body, and the stem, passageways within the casing leading from the space below the main piston to the space above said piston, passageways within the bottom closure leading into the interior of said body and to the space outside thereof, spring means mounted upon a stationary support outside the casing and acting upon said main piston rod and the main piston to deform said hollow body, and cam means associated with the stem and operable from outside the casing to engage the rod extending from the second piston to move said second piston upwardly to generate pressure within the liquid medium within the casing.

7. A hydromechanical device including a cylindrical casing having at one end a base closure and having at the other end a top closure provided with an axial aperture, an elongated body co-axially placed within the casing against the base closure the body being adapted to be deformed by axially applied pressure thereto but being capable of resuming its original form on relief of said pressure, a piston within the casing bearing against said body in the direction of the base closure, power means outside the casing to move the piston against the resistance of said body, a rod extending from the piston through the aperture in the top closure, a hollow stem connected to the piston and extending outwardly from the casing through the base closure, the stem being provided with openings into the interior of the casing, and the wall of the casing being provided with ducts leading from the space between the piston and the base closure to the space between the piston and the top closure, a fluid medium filling said ducts, said stem and the casing to its full capacity, and a piston within the stem for operation from outside the casing to develop pressure of the liquid within the casing.

8. A hydromechanical device including a cylindrical casing having at one end a base closure and having at the other end a top closure provided with an axial aperture, an elongated body co-axially placed within the casing against the base closure, the body being adapted to be deformed by pressure axially applied thereto but being capable of resuming its original form on relief of said pressure, a piston within the casing bearing against said body in the direction of the base closure, a piston rod extending from said piston outwardly through the aperture in the top closure, the piston being adapted to be operated by power means from outside the casing, a holow stem disposed outside the casing but opening into the interior of said casing between said piston and the base closure, the wall of the casing being provided with ducts leading from the space between the piston and the base closure to the space between the piston and the top closure, a fluid medium filling said ducts, said stem, and the casing to its full capacity, and a piston within the stem, the piston being adapted to be operated from outside the casing to develop pressure of the fluid medium in said casing.

References Cited in the file of this patent
UNITED STATES PATENTS
2,736,580     Boetcker _____ Feb. 28, 1956